Dec. 4, 1923.  1,476,532
A. W. MacILWAINE
PRESERVATION AND PREPARATION FOR TRANSPORTATION OF COTTON SEED
Filed May 20, 1922  2 Sheets-Sheet 1

Dec. 4, 1923.  1,476,532
A. W. MacILWAINE
PRESERVATION AND PREPARATION FOR TRANSPORTATION OF COTTON SEED
Filed May 20, 1922   2 Sheets-Sheet 2

Patented Dec. 4, 1923.

1,476,532

UNITED STATES PATENT OFFICE.

ALFRED WILLIAM MacILWAINE, OF NORTH FERRIBY, ENGLAND.

PRESERVATION AND PREPARATION FOR TRANSPORTATION OF COTTONSEED.

Application filed May 20, 1922. Serial No. 562,562.

*To all whom it may concern:*

Be it known that I, ALFRED WILLIAM MAC-ILWAINE, a subject of the King of England, residing at North Ferriby, East Riding of Yorkshire, England, have invented certain new and useful Improvements in the Preservation and Preparation for Transportation of Cottonseed, of which the following is a specification.

This invention is for improvements in or relating to the preservation and preparation for transportation of cotton seed.

In the specification of my co-pending United States application No. 562,561, May 20, 1922, there is described a method of preparation for transport and (or) preservation of oil-yielding raw material, such as nuts, seeds and copra, said method consisting in compressing quantities of the material, in bulk, under a pressure insufficient to express any of the contained oil, or any appreciable quantity of the contained oil, but sufficient to form blocks or packages of increased density.

The present invention deals with the application of the above process to the treatment of cotton seeds. Thus, according to the present invention the seeds are prepared for transport and (or) preserved from decomposition by compressing quantities thereof in bulk, under a pressure insufficient to express any appreciable quantity of the contained oil, but sufficient to form a package of greatly reduced bulk. It is an important feature of the present invention that the pressures employed for compacting the masses of seeds shall not be sufficient to bring about any substantial expression of oil into the spaces between the particles.

In the preferred method of carrying the invention into effect the compression pressure is such that none of the contained oil is expressed, while the material is formed into a coherent block. Conveniently the compression pressure employed is in the region of two tons per square inch on the block, but it will be understood that the actual compression pressure depends to some extent on the quality of the seeds to be treated, and no single value of pressure can be given as applicable in general to cotton seed. Provided, however, the pressure is within the limits hereindescribed, the objects of the invention will be achieved.

The compression restricts access of the atmosphere to the seeds and the contained oil, and preserves the oil accordingly. By compressing the cotton seed accompanied by corresponding exclusion of air, the risk of spontaneous combustion and fire is considerably lessened.

The invention includes a block or package of cotton seed, prepared in the manner above set forth.

One preferred method of carrying this invention into effect will now be described in detail by way of example only, reference being made to the accompanying drawings in which—

Like reference numerals indicate like parts throughout the two figures of the drawings.

Figure 1:
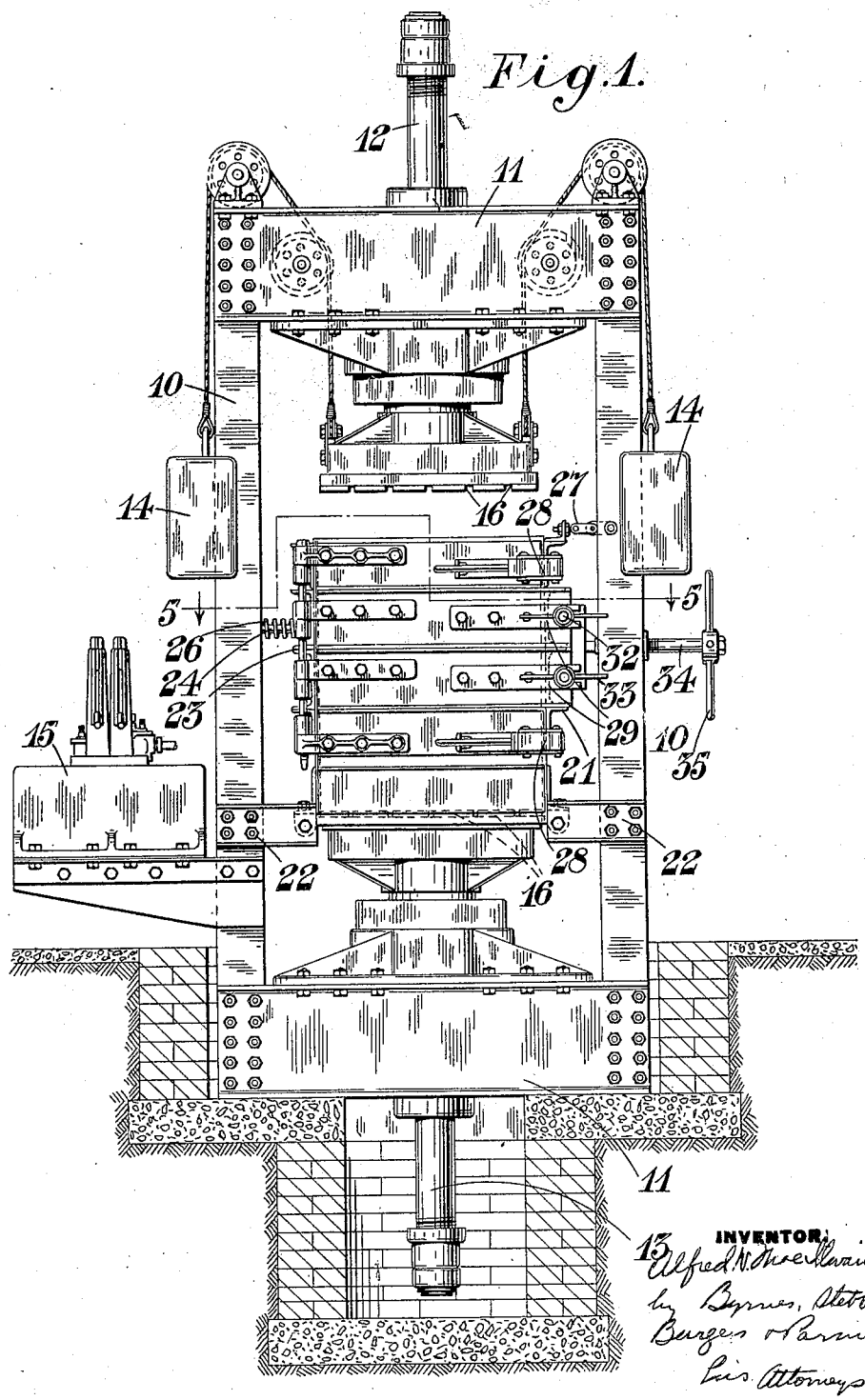
Figure 1 shows in elevation one suitable form of press.

The press comprises two upright columns 10 of I-section connected top and bottom by cross members 11. The press is adapted to apply pressure at top and bottom simultaneously and for this purpose two hydraulic plungers 12, 13 are provided, the former being movable downwards against the action of counter-balance weights 14 which have a steadying action on the pressure and also serve to return the upper plunger to its normal inoperative position when the hydraulic pressure is released. The weights 14 extend in width beyond the sides of the columns 10, the outer flanges of the columns being engaged in recesses in the weights whereby the latter are guided in their vertical movement. The control gear for the plungers is indicated generally by the reference numeral 15. The head plate of each press plunger is provided with slats 16 running parallel to the webs of the columns 10.

Figure 2:
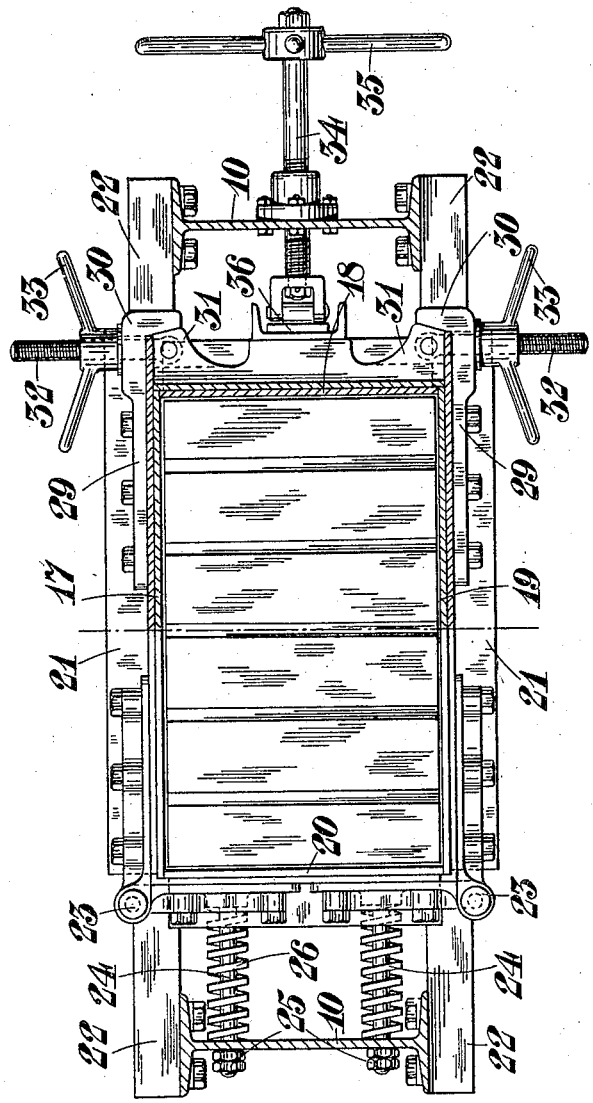
Figure 2 is a part sectional plan on the line 5—5 of Figure 1.

The compression chamber comprises an upright hollow box of rectangular cross-section, open at top and bottom, and with its sides (17, 18, 19, 20) strengthened by angle and channel stiffeners 21. The box is secured between the columns 10 of the press, the angle stiffeners at the lower ends of the sides 18 and 20 being pivotally secured to channel plates 22, which are themselves bolted to the flanges of the columns. The sides 17 and 19 constituting the front and back of the box, are hinged to the side 20 and may be swung relatively thereto about the hinges 23 at the meeting edges of the three sides. The side 20 is resiliently secured to the adjacent column 10 by bolts 24 which pass through apertures in the web of the column, have their outer ends engaged by nuts 25, and are encircled by springs 26 in compression between the box side and the web of the column. The side 18 is connected by means of two short links 27 to the adjacent column 10. The box is held together at the meeting edges of the sides 17 and 19 with the side 18 by two sets of securing devices. One set comprises spring fasteners 28 in the region of the top and bottom of the box, and the other set comprises arms 29 with bifurcated jaws 30 adapted to engage with co-operating lugs 31 on the box side 18, and to be held in the engaged position (shown clearly in Figure 2) by means of swivel bolts 32 and winged nuts 33. The bolts 32 are pivoted to the side 18 and may be swung through the forked jaws 30 into the position shown. In order that the box may be properly aligned before pressure is applied there is provided a spindle 34 in screw-threaded engagement in the web of the column 10 adjacent the box-side 18. This spindle has a handled portion 35 at its outer end and at its inner end carries a block 36 abutting a part of the box-side 18. It will be seen that the springs 26 co-operate with the spindle 34 in the adjustment of the box.

Normally the head-plate of the lower plunger is just entered in the lower end of the box. In operation the box is charged with seeds, hydraulic pressure is applied and the two plungers moved gradually towards one another, the pressure being in the region of two tons per square inch on the block. While pressure is still maintained the spring fasteners 28 are undone, the winged nuts 33 unscrewed and the bolts 32 swung inwards until they are clear of the jaws 30. The sides 17 and 19 may now be opened outwards to allow access to the compressed seeds. Wires, cords or hooping are passed round the block between the slats 16, and are then made fast. The plungers are then withdrawn, the spindle 34 unscrewed, and the block removed. The resultant blocks are rectangular in shape and may thus be stowed for transport and shipment without waste of space.

Preferably before pressure is applied a number of wooden laths (say three) are laid across the lower head-plate transversely to the slats 16, and a sheet of jute or like material is spread over these laths. At the same time a second jute or like sheet is spread over the top of the box and a number of wooden laths are then placed over this sheet. Pressure is then applied. The wires or the like which are passed round the block will then encircle the two sets of the laths and also the jute sheets, and the latter may be folded round the block and subsequently sewn up. In this way it will be seen that the laths prevent the wires or other binding elements from cutting into or in any way damaging the jute covering.

I claim:—

1. A method of preserving cotton seeds and preparing them for transport which consists in compressing quantities of said seeds in bulk under a pressure insufficient to express any appreciable quantity of the contained oil but sufficient to form a package of greatly reduced bulk.

2. A method of preserving cotton seeds and preparing them for transport which consists in compressing quantities of said seeds in bulk under a pressure insufficient to express any of the contained oil but sufficient to form the seeds into a coherent block.

3. A method of preserving cotton seeds and preparing them for transport which consists in compressing quantities of said seeds in bulk under a pressure in the region of two tons per square inch on the seeds.

4. A method of preserving cotton seeds and preparing them for transport which consists in compressing quantities of said seeds in bulk under a pressure insufficient to express any appreciable quantity of the contained oil but sufficient to reduce to a great extent the bulk of the seeds, and enclosing the compressed seeds in a packing of jute-like material.

5. A method of preserving cotton seeds and preparing them for transport which consists in compressing quantities of said seeds in bulk under a pressure insufficient to express any appreciable quantity of the contained oil but sufficient to form a coherent block, enclosing the compressed block in a packing of jute-like material, and thereafter passing binding elements round said packing.

6. A method of preserving cotton seeds and preparing them for transport, which consists in compressing quantities of said seeds in bulk in their shells under a pressure insufficient to express any appreciable quantity of the contained oil but sufficient to form a package of greatly reduced bulk.

7. As a new product, a coherent block of cotton seeds in which the seeds are free from oil on their exterior, the block being substantially free from interstitial air spaces.

8. As a new product, a coherent block of cotton seeds enclosed in their shells, the latter being free from oil on their exterior, and the block being substantially free from interstitial air spaces.

In testimony whereof I affix my signature.

ALFRED WILLIAM MacILWAINE.